(12) United States Patent
Nozaki et al.

(10) Patent No.: US 7,690,468 B2
(45) Date of Patent: Apr. 6, 2010

(54) DRIVE SWITCHING MECHANISM FOR VEHICLE

(75) Inventors: Naoki Nozaki, Saitama (JP); Takeshi Kobayashi, Saitama (JP); Dai Arai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 229 days.

(21) Appl. No.: 11/727,802

(22) Filed: Mar. 28, 2007

(65) Prior Publication Data

US 2007/0235242 A1   Oct. 11, 2007

(30) Foreign Application Priority Data

Mar. 31, 2006   (JP)   ............................. 2006-096579

(51) Int. Cl.
  *B60K 20/00* (2006.01)
  *B60K 23/08* (2006.01)
(52) U.S. Cl. .................................... 180/247; 74/473.32
(58) Field of Classification Search ................. 180/247, 180/248, 249, 250; 74/473.11, 473.32, 473.33
  See application file for complete search history.

(56) References Cited

U.S. PATENT DOCUMENTS

| 1,511,908 | A | * | 10/1924 | Pickering | .................... 475/237 |
| 4,775,026 | A | * | 10/1988 | Sollbach et al. | ............. 180/249 |
| 5,433,125 | A | * | 7/1995 | Muller | .................... 74/473.11 |
| 6,357,315 | B1 | * | 3/2002 | Smith et al. | .............. 74/473.11 |
| 7,219,574 | B2 | * | 5/2007 | Ichida et al. | ............... 74/502.2 |
| 2008/0210483 | A1 | * | 9/2008 | Takahashi et al. | ........... 180/250 |

FOREIGN PATENT DOCUMENTS

| JP | 62-46376 | B2 | 10/1987 | |
| JP | 63-315329 | | * 12/1988 | ................. 180/249 |

* cited by examiner

*Primary Examiner*—Lesley Morris
*Assistant Examiner*—Marc A Scharich
(74) *Attorney, Agent, or Firm*—Birch, Stewart, Kolasch & Birch, LLP

(57) ABSTRACT

To provide a drive switching mechanism for a vehicle which allows the number of parts to be reduced by simplifying the structure for 2WD/4WD switching and differential lock switching. In a drive switching mechanism for a vehicle which enables 2WD/4WD switching and differential lock switching to be effected by a single operating lever, a flange is supported on the body side so as to be pivotable in one direction, the operating lever is coupled to the flange and the flange is pivoted in the one direction, and the operating lever is supported so as to be pivotable in the other direction different from the one direction, the operating lever being operated in the one direction or the other direction to enable the 2WD/4WD switching and the differential lock switching.

4 Claims, 14 Drawing Sheets

| SWITCHING PATTERN | 2WD/4WD SELECT | REAR-WHEEL DIFFERENTIAL LOCK | FRONT-WHEEL DIFFERENTIAL LOCK |
|---|---|---|---|
| 1-1 | 2WD | FREE | FREE |
| 1-2 | 4WD | LOCK | FREE |
| 1-3 | 4WD | LOCK | LOCK |

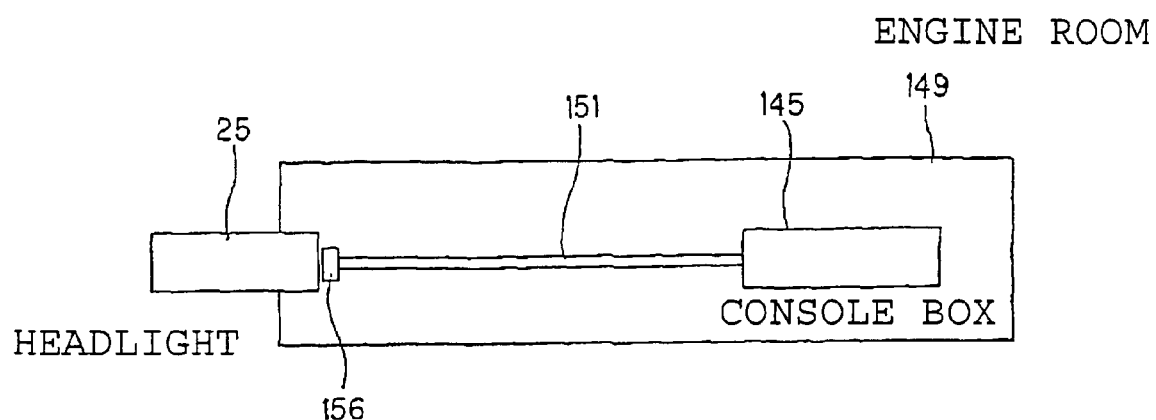
FIG. 15
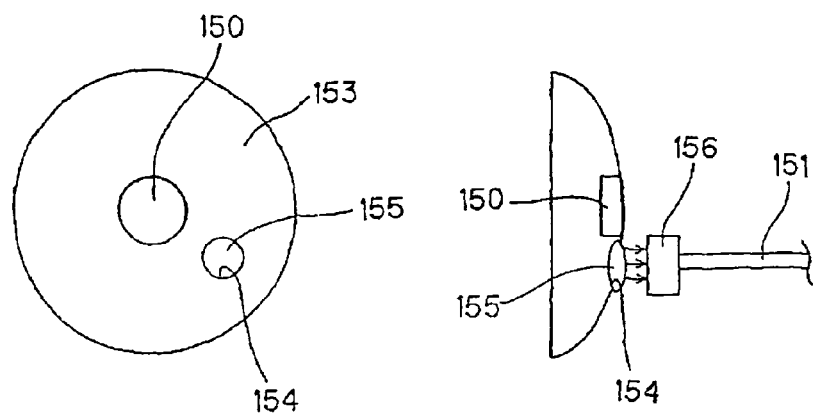
FIG. 16(a)  FIG. 16(b)

DRIVE SWITCHING MECHANISM FOR VEHICLE

CROSS-REFERENCE TO RELATED APPLICATIONS

The present application claims priority under 35 USC 119 to Japanese Patent Application No. 2006-096579 filed on Mar. 31, 2006 the entire contents of which are hereby incorporated by reference.

BACKGROUND OF THE INVENTION

1. Field of the Invention

The present invention relates to a drive switching mechanism for a vehicle which enables 2WD/4WD switching as well as differential lock switching.

2. Description of Background Art

A drive switching mechanism for a vehicle which enables 2WD/4WD switching and differential lock switching to be effected by a single operating lever is commonly known. See, for example, JP-B No. S62-046376. In the drive switching mechanism of this type, an operating mechanism for 2WD/4WD switching and an operating mechanism for differential lock switching are separately provided, these operating mechanisms are coupled together by a coupling mechanism, and a single operating lever is coupled to this coupling mechanism to perform 2WD/4WD switching and differential lock switching.

In the construction according to the related art, however, problems are involved wherein although a single operating lever is used, the presence of two operating mechanisms leads to an increased complexity of the structure and an increased number of parts. Further, in the construction according to the related art, since the operating lever is operated in a single direction, the 2WD/4WD switching and differential lock switching positions are present within that single direction. In this case, to ensure reliable operation, it is necessary to provide a positioning member or the like separately, which leads to such problems as the increased number of parts.

SUMMARY AND OBJECTS OF THE INVENTION

To address the above-mentioned problems associated with the related art, it is an object of an embodiment of the present invention to provide a drive switching mechanism for a vehicle which allows a reduction in the number of parts by simplifying the structure for the 2WD/4WD switching and differential lock switching.

To attain the above-mentioned object, according to an embodiment of the present invention, there is provided a drive switching mechanism for a vehicle which enables 2WD/4WD switching and differential lock switching to be effected by a single operating lever, wherein a flange is supported on a body side so as to be pivotable in one direction. The operating lever is coupled to the flange and the flange is pivoted in the one direction, and the operating lever is supported so as to be pivotable in the other direction different from the one direction with the operating lever being operated in the one direction or the other direction to enable 2WD/4WD switching and differential lock switching.

According to this construction, the operating mechanisms are integrated into a single structure, and the switching from 2WD to 4WD mode and the switching from a differential free to a differential lock position can be effected by operating the operating lever in one direction and in the other direction different from the one direction, thereby enhancing the ease of switching operation.

In this case, a construction may be adopted in which the vehicle includes a final reduction gear having a differential gear and a differential lock mechanism in each of front and rear wheels, 2WD/4WD switching and rear-wheel differential lock switching can be effected by operating the operating lever in the one direction, and front-wheel differential lock switching can be effected by operating the operating lever in the other direction.

According to this construction, the switching from 2WD to 4WD mode and the switching of the rear wheels from differential free to differential lock position can be simultaneously effected by a single switching operation of the single operating lever in one direction. Further, the switching of the front wheels from the differential free to the differential lock position can be effected by a single operation of the operating lever in the other direction, thereby enhancing the ease of switching operation.

Further, the above-mentioned one direction may extend longitudinally, and the above-mentioned other direction may extend laterally.

According to this construction, for example, the switching from 2WD to 4WD mode, and the switching of the rear wheels from differential free to differential lock position can be simultaneously effected by a single switching operation in the lateral direction. In addition, the switching of the front wheels from differential free to differential lock position can be effected by a single switching operation in the longitudinal direction. The operation thus becomes reliable. Further, the operation is performed in the longitudinal and lateral directions as seen from the driver's seat, thus providing a comfortable operating posture and enhanced ease of switching operation.

A support bracket may be fixed onto the flange, with the operating lever being supported on the support bracket so as to be pivotable in the other direction.

According to this construction, for example, when the lower end of the operating lever is coupled to the boss portion, this boss portion is supported on the support bracket so as to be rotatable in the lateral direction as seen from the driver's seat, the support bracket is fixed to the flange, and this flange is supported on the body side so as to be pivotable in the longitudinal direction as seen from the driver's seat, as compared with the construction in which the operating mechanism for 2WD/4WD switching and the operating mechanism for differential lock switching are separately provided as in the related art, it is possible to simplify the structure and reduce the number of parts. Further, in the related art, since the operating lever is operated in a single direction, the 2WD/4WD switching positions and the differential lock switching positions are present within that single direction, and the operating lever is set to the positions corresponding to the respective switching positions, so the operation becomes reliable. Further, since the operating lever is operated in two directions, that is, in one direction and in the other direction different from the one direction, the operation becomes reliable. Since the operation is performed in one direction and in the other direction, a positioning member becomes unnecessary, thereby achieving a reduction in the number of parts.

According to an embodiment of the present invention, since the 2WD/4WD switching and the differential lock switching can be effected through the operation of the operating lever in one direction and in the other direction different from the one direction, the operation becomes reliable, and the ease of switching operation is enhanced.

Further, when the switching from 2WD to 4WD mode and the switching of the rear wheels from differential free to differential lock position can be simultaneously effected by a single switching operation of the single operating lever in one direction. Further, the switching of the front wheels from differential free to differential lock position can be effected by a single operation of the operating lever in the other direction. Thus, the operation becomes reliable, and the ease of switching operation is enhanced.

Further, for example, the 2WD/4WD switching and the switching of the rear wheels from differential free to differential lock position can be simultaneously effected by a single switching operation in the lateral direction. Further, the switching of the front wheels from differential free to differential lock position can be effected by a single switching operation in the longitudinal direction, the operation becomes reliable. The operation is performed in the longitudinal and lateral directions as seen from the driver's seat, thus providing a comfortable operating posture and enhanced ease of switching operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 15 is a diagram showing the connecting arrangement for an acrylic bar; and

FIG. 16 FIG. 16(a) is a front view of a light receiving portion, and FIG. 16(b) is a side view of the light receiving portion.

DETAILED DESCRIPTION OF THE PREFERRED EMBODIMENTS

An embodiment of the present invention will now be described with reference to the accompanying drawings.

Figure 1:
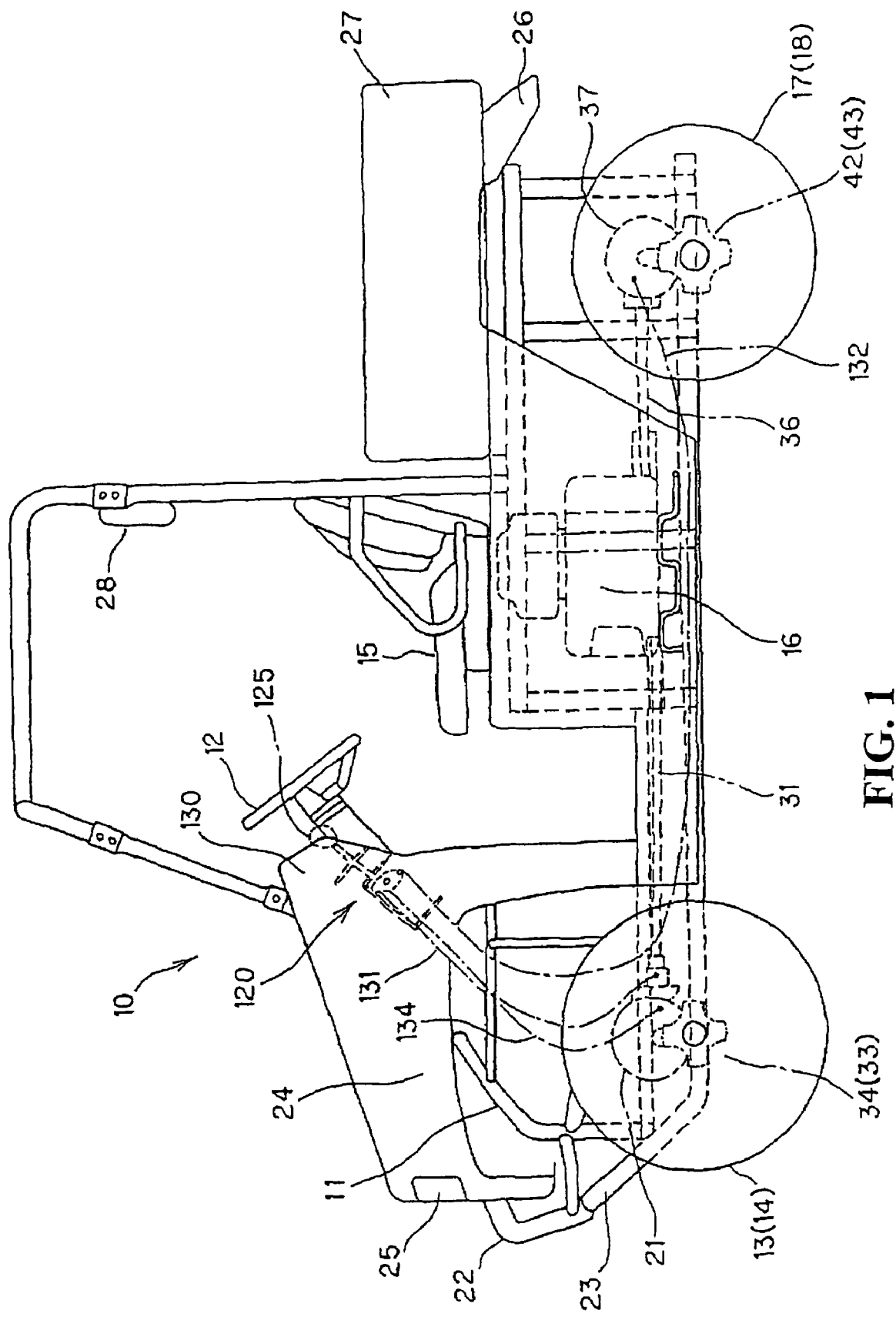
FIG. 1 is a side view of a vehicle incorporating a vehicle drive switching mechanism according to the present invention.

In FIG. 1, a vehicle 10, which is suitable for driving on rough terrain, includes a steering wheel 12 rotatably mounted to a body frame 11 with front wheels 13, 14 that are each steerably coupled to the steering wheel 12 via a steering device (not shown), and mounted to a body frame 11 via an arm (not shown) so as to be vertically movable. A seat 15 is mounted to an upper portion of the body frame 11. A power unit 16 including an engine and a transmission are provided and are arranged below the seat 15. Rear wheels 17, 18 that are driven together with the front wheels 13, 14 by the power unit 16 via a power transmission mechanism that will be described later.

A front final assembly 21 includes a front-wheel final reduction gear as a part of the power transmission mechanism, and is interposed between the left and right front wheels 13, 14. A rear final assembly 37 includes a rear-wheel final reduction gear which is interposed between the rear wheels 17, 18. A carrying pipe 22 is provided together with an undercover 23, a front fender 24, a headlight 25, a rear fender 26, a load-carrying platform 27, and a headrest 28.

Figure 2:
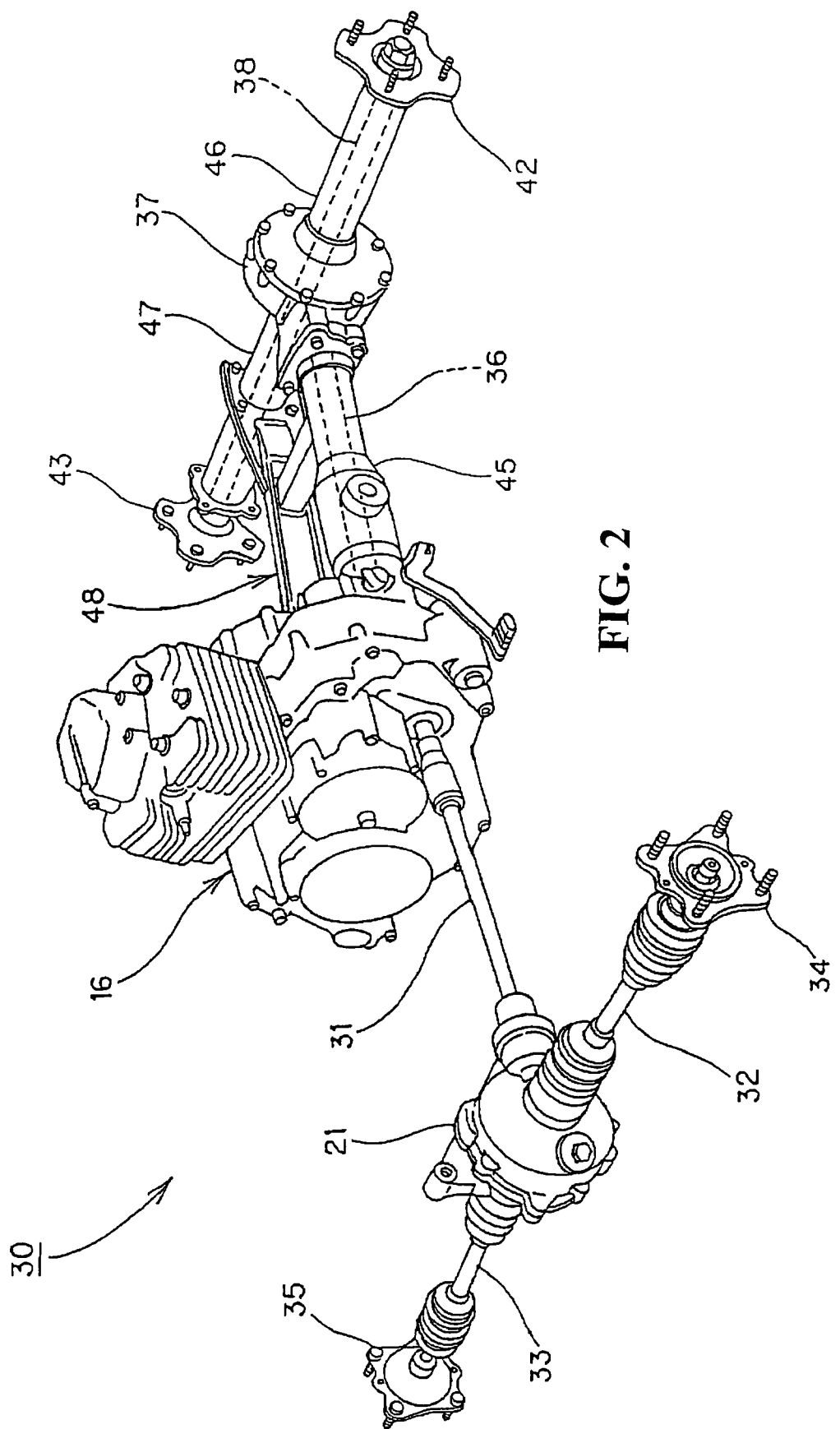
FIG. 2 is a perspective view showing a power transmission mechanism for the vehicle.

FIG. 2 shows the power transmission mechanism mentioned above.

A power transmission mechanism 30 includes a front propeller shaft 31 extending forward from a lower portion of the power unit 16 with the front final assembly 21 coupled to the distal end of the front propeller shaft 31. Front drive shafts 32, 33 are coupled to the left and right sides of the front final assembly 21 with hubs 34, 35 respectively coupled to the distal ends of the front drive shafts 32, 33. A rear propeller shaft 36 extends rearwardly from a lower portion of the power unit 16 with the rear final assembly 37 coupled to the rear end of the rear propeller shaft 36. A rear drive shaft 38 laterally extends through the rear final assembly 37 with hubs 42, 43 respectively coupled to the opposite distal ends of the rear drive shaft 38. Tubes 45, 46, 47 are provided that respectively cover the left and right sides of the rear propeller shaft 36 and rear drive shaft 38. A support member 48 is provided for supporting the tubes 45, 47. The hubs 34, 35, 42, 43 are members to which the front wheels 13, 14 and the rear wheels 17, 18 shown in FIG. 1 are mounted.

Figure 3:
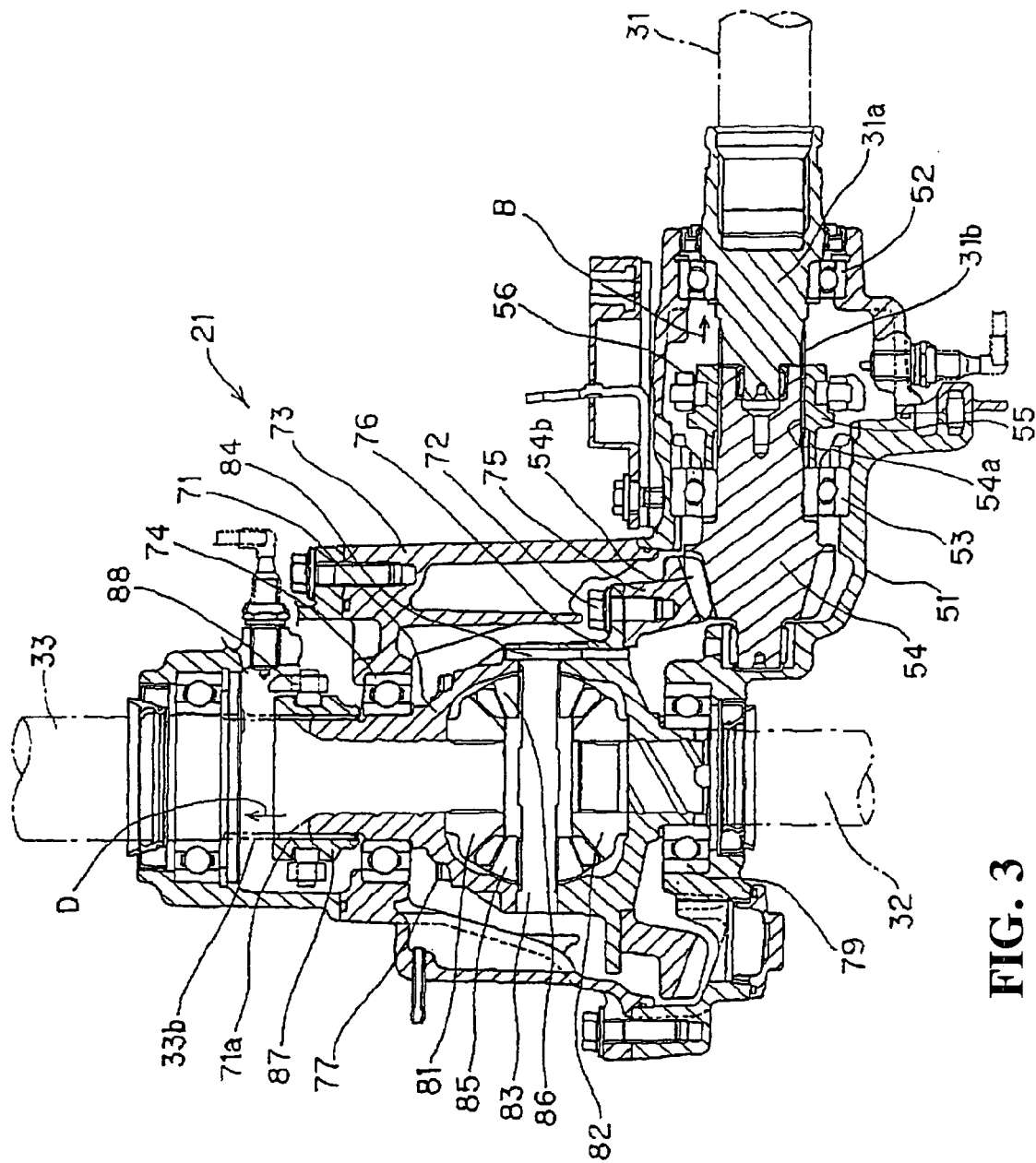
FIG. 3 is a sectional view of a front final assembly.

FIG. 3 shows the structure of the front final assembly 21.

Figures 4A, 4B:
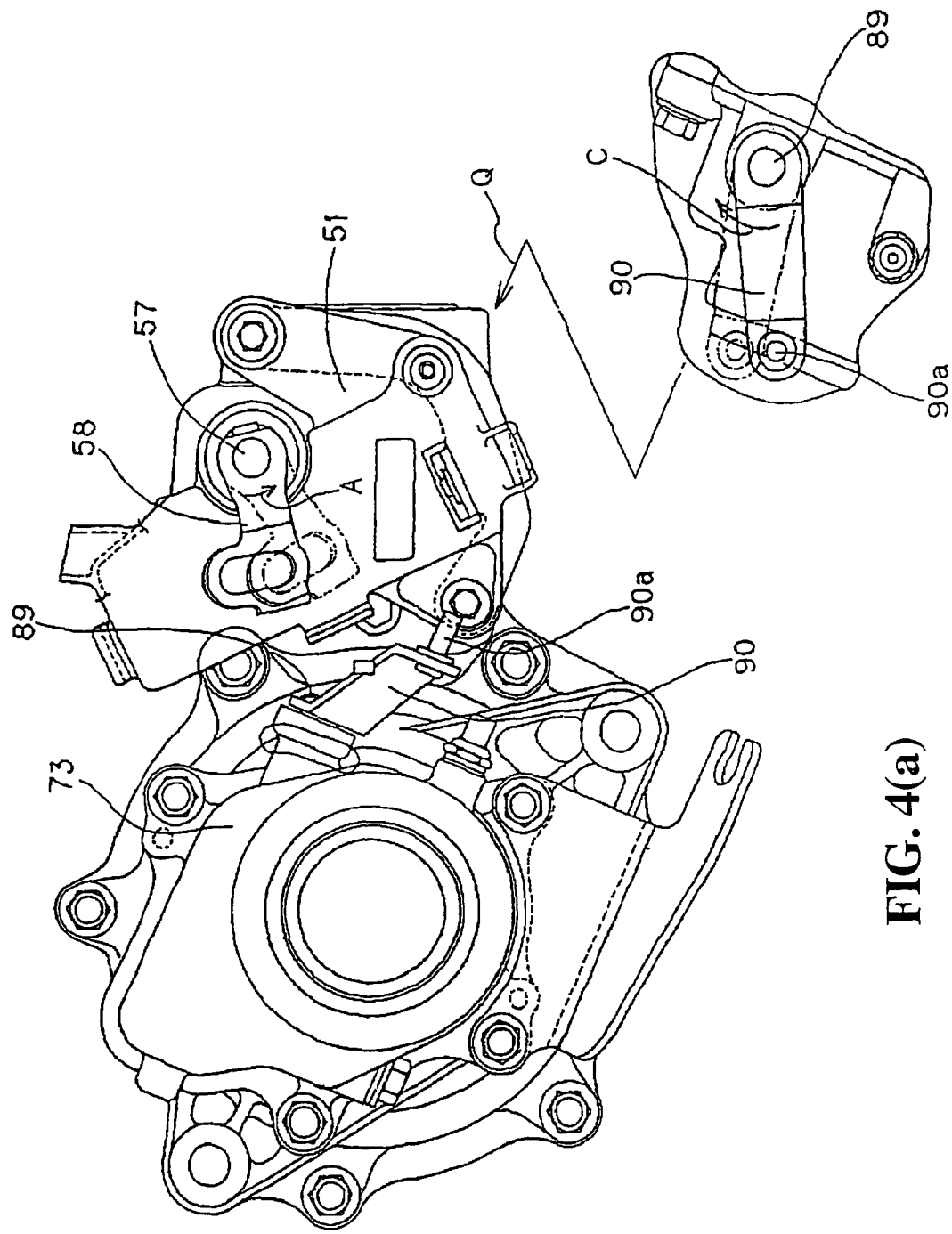
FIG. 4(a) is an exterior view of a front final assembly.
FIG. 4(b) is a view of FIG. 4(a) as seen from the arrow Q.

The front final assembly 21 includes an input-side housing 51. A distal end portion 31a of the front propeller shaft 31 is rotatably supported on the housing 51 via a bearing 52. A drive pinion 54 is coupled to the distal end portion 31a so as to be capable of relative rotation. The drive pinion 54 is supported on the housing 51 via a bearing 53. A spline 54a is formed in the outer periphery of the drive pinion 54. A spline in the inner periphery of a sleeve 55 is in meshing engagement with the spline 54a. The sleeve 55 moves in the axial direction, thus allowing the above-mentioned spline of the sleeve 55 to come into meshing engagement with a spline 31b in the outer periphery of the distal end portion 31a. A fork 56 engages with the sleeve 55. As shown in FIG. 4A, the fork 56 is coupled to a rotary shaft 57 that extends outward from the housing 51. As a lever 58 fixed to the rotary shaft 57 pivots in the arrow A direction, the fork 56 moves in the arrow B direction in FIG. 3, causing the sleeve 55 to move in the axial direction. In the state shown in FIG. 3, the sleeve 55 is located on the drive pinion 54 side, and the coupling between the front propeller shaft 31 and the drive pinion 54 is cut off; when the sleeve 55 moves in the arrow B direction, the spline in the inner periphery of the sleeve 55 comes into meshing engagement with each of the spline 54a in the outer periphery of the drive pinion 54 and the spline 31b in the outer periphery of the distal end portion 31a, thereby coupling the front propeller shaft 31 and the driving pinion 54 to each other.

According to this construction, the vehicle is switched to 4WD when these components are coupled to each other, and to 2WD when the coupling is released. A mechanism including the sleeve 55, the fork 56, and a fork operating mechanism constitute a 2WD/4WD switching mechanism.

A pinion gear 54b of the drive pinion 54 meshes with a ring gear 75. The ring gear 75 is coupled to a cap 76 via a plurality of bolts 72. The cap 76 is rotatably supported on the extended portion of the housing 51 via a bearing 79. Further, the cap 76 is coupled to a differential case 71 via a plurality of bolts 77. The differential case 71 is rotatably supported on an output-side housing 73 via a bearing 74.

A left side gear 81 and a right side gear 82 are provided inside the differential case 71. The distal ends of the front drive shafts 32, 33 are fixed to the left and right side gears 81, 82. Further, inside the differential case 71, a differential pinion shaft 83 is positioned in place by a pin 84. Differential pinion gears 85, 86 for transmitting the rotational force of the differential case 71 to the left and right side gears 81, 82 are supported on both ends of the differential pinion shaft 83.

A spline 71a is formed in the outer periphery of a part of the differential case 71 extending through the bearing 74. A spline in the inner periphery of a sleeve 87 meshes with the spline 71a. The sleeve 87 moves in the axial direction, so the above-mentioned spline of the sleeve 87 can freely mesh with a spline 33b in the outer periphery of the front drive shaft 33. A fork 88 engages with the sleeve 87. As shown in FIG. 4B, the fork 88 is coupled to a rotary shaft 89 that extends outward from the housing 73. As a lever 90 fixed to the rotary shaft 89 pivots in the arrow C direction, the fork 88 moves in the arrow D direction in FIG. 3, causing the sleeve 87 to move in the axial direction. In the state shown in FIG. 3, the sleeve 87 is located on the differential case 71 side, and as a result, the coupling between the front drive shaft 33 and the differential case 71 is cut off. When the sleeve 87 moves in the arrow D direction, the spline in the inner periphery of the sleeve 87 comes into meshing engagement with each of the spline 33b of the front drive shaft 33 and the spline 71a of the differential case 71, thereby coupling the front drive shaft 33 and the differential case 71 to each other.

In this embodiment, a mechanism including the sleeve 87, the fork 88, and a fork operating mechanism constitutes a differential lock mechanism of the front wheels 13, 14. When the sleeve 87 is dislodged from the front drive shaft 33 and moves to the differential case 71 side as shown in FIG. 3, the drive force on the drive pinion 54 side at the time of 4WD is transmitted to the differential case 71 by way of the pinion gear 54b, the ring gear 75, and the cap 76. Since the differential lock mechanism is released (hereinafter, this state is referred to as "differential free"), the rotational force of the differential case 71 is transmitted to the left and right side gears 81, 82 solely via the differential pinion gears 85, 86, and output to the front drive shafts 32, 33.

In this case, a differential gear for the front wheels 13, 14 operates, and drive is performed while absorbing a difference in rotation between the left and right drive wheels. For example, when making a left turn of the vehicle, the left drive wheel rotates slowly, and even when the left drive wheel attempts to rotate at the same rotational speed as that of the right drive wheel, a greater load is exerted on the left drive wheel than on the right drive wheel. When a load is exerted on the left drive wheel, the left side gear 82 becomes hard to rotate. Since the rotation of the differential pinion shaft 83 mentioned above does not change, the rotation of the differential pinion shaft 83 becomes faster than the rotation of the left side gear 82, so the differential pinion gears 85, 86 rotate, and the rotation corresponding to the load on left side gear 82 is added for transmission to the right side gear 81.

In contrast, in cases such as when one of the wheels rotates idle, the differential lock mechanism is operated (hereinafter, this sate is referred to as "differential lock"), and the front drive shaft 33 and the differential case 71 are coupled to each other via the sleeve 87. Since the rotational force of the differential case 71 is directly transmitted to the front drive shaft 33 via the sleeve 87, the differential pinion gears 85, 86 do not rotate, and the left and right drive wheels rotate equally.

Figure 5:
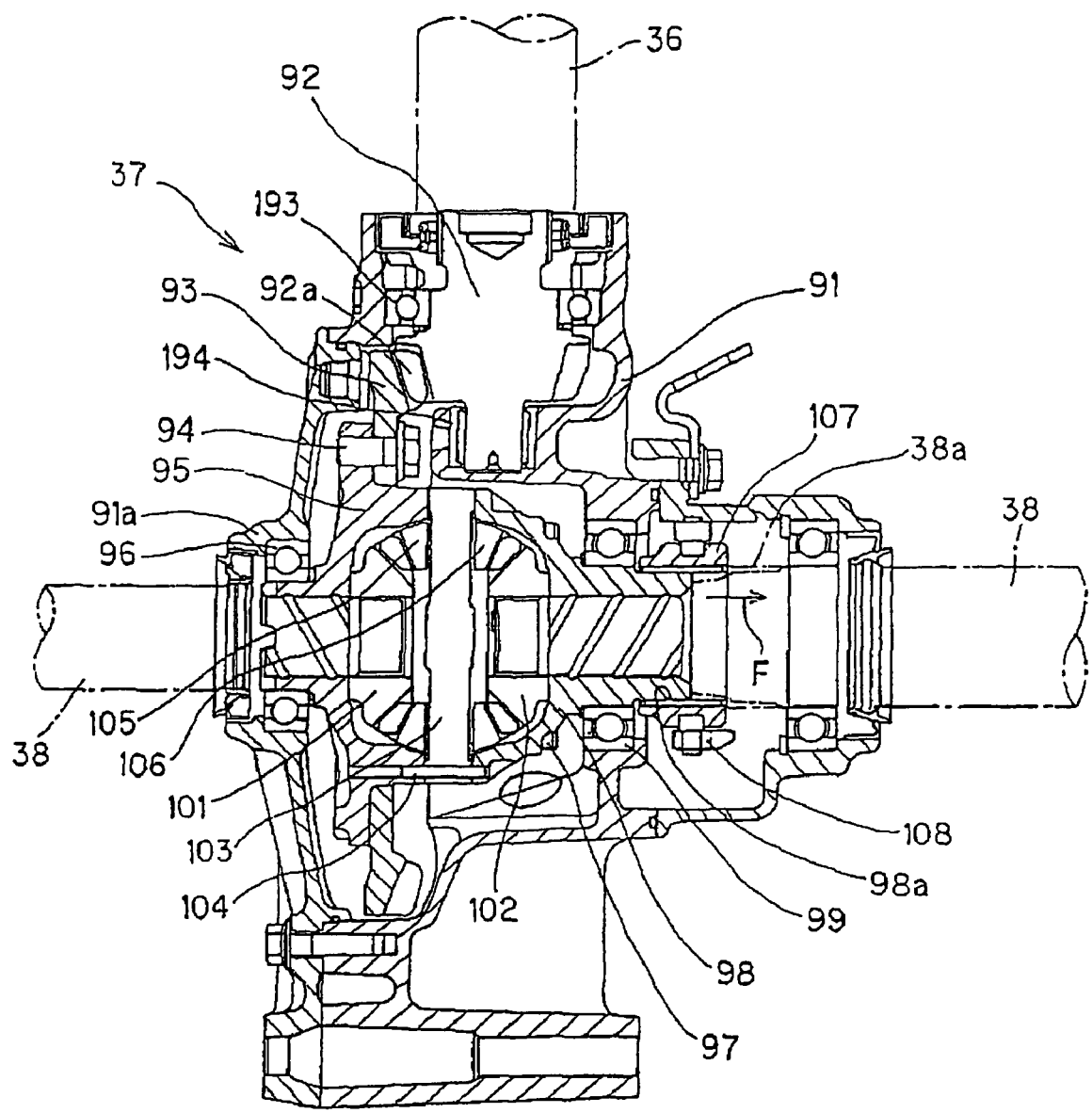
FIG. 5 is a sectional view of a rear final assembly.

FIG. 5 shows the structure of the rear final assembly 37.

The rear final assembly 37 includes a housing 91. A drive pinion 92, to which the distal end of the rear propeller shaft 36 is coupled, is rotatably supported on the housing 91 via bearings 193, 194.

A pinion gear 92a of the drive pinion 92 meshes with a ring gear 93. The ring gear 93 is coupled to a cap 95 via a plurality of bolts 94. The cap 95 is rotatably supported on a housing cap 91a via a bearing 96. Further, the cap 95 is coupled to a differential case 98 via a plurality of bolts 97. The differential case 98 is rotatably supported on the housing 91 via a bearing 99.

A right side gear 101 and a left side gear 102 are provided inside the differential case 98. The distal end of the rear drive shaft 38 is fixed to the left and right side gears 101, 102. Further, inside the differential case 98, a differential pinion shaft 103 is positioned in place by a pin 104. Differential pinion gears 105, 106 for transmitting the rotational force of the differential case 98 to the left and right side gears 101, 102 are supported on both ends of the differential pinion shaft 103.

Figure 6A:
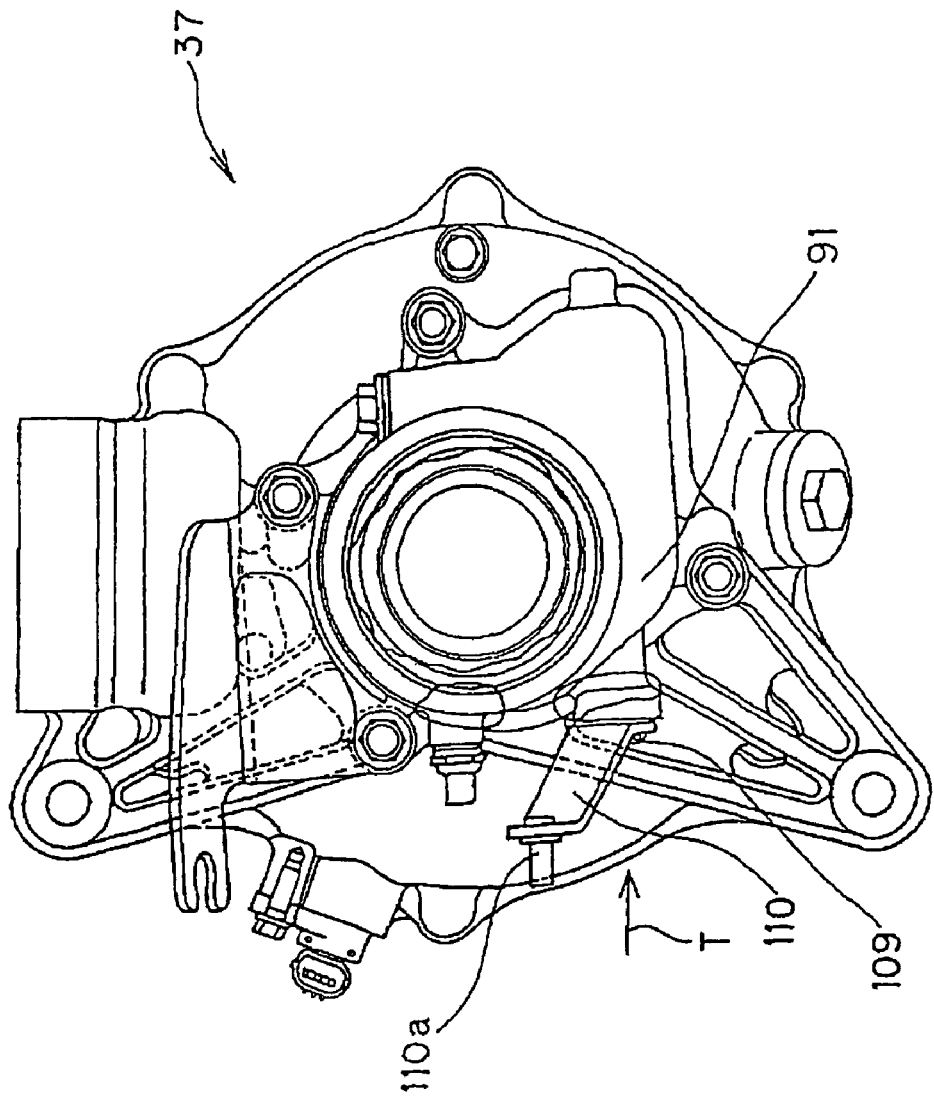
FIG. 6(a) is an exterior view a rear final assembly.
Figure 6B:
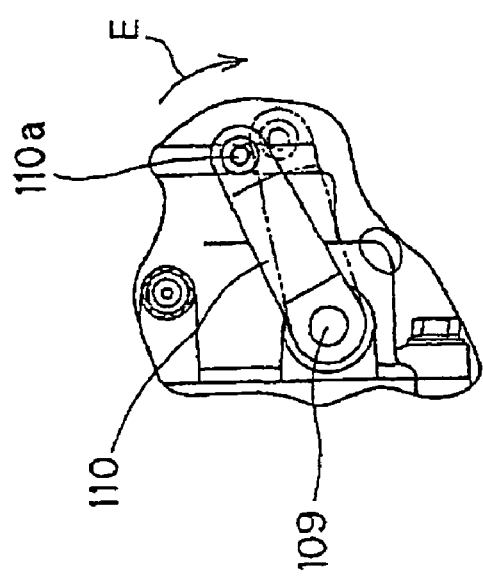
FIG. 6(b) is a view of FIG. 6(a) as seen from the arrow T.

A spline 98a is formed in the outer periphery of a part of the differential case 98 extending through the bearing 99. A spline in the inner periphery of a sleeve 107 meshes with the spline 98a. The sleeve 107 moves in the axial direction, so the above-mentioned spline of the sleeve 107 can freely mesh with a spline 38b in the outer periphery of the rear drive shaft 38. A fork 108 engages with the sleeve 107. As shown in FIG. 6B, the fork 108 is coupled to a rotary shaft 109 that extends outwardly from the housing 91. As a lever 110 fixed to the rotary shaft 109 pivots in the arrow E direction, the fork 108 moves in the arrow F direction in FIG. 5, causing the sleeve 107 to move in the axial direction. In the state shown in FIG. 5, the sleeve 107 is located on the differential case 98 side, and as a result, the coupling between the rear drive shaft 38 and the differential case 98 is cut off. When the sleeve 107 moves in the arrow F direction, the spline in the inner periphery of the sleeve 107 comes into meshing engagement with each of the spline 38b of the rear drive shaft 38 and the spline 98a of the differential case 98, thereby coupling the front drive shaft 38 and the differential case 98 to each other.

In this construction, a mechanism including the sleeve 107, the fork 108, and a fork operating mechanism constitutes a differential lock mechanism of the rear wheels 17, 18.

When the sleeve 107 is dislodged from the rear drive shaft 38 and moves to the differential case 98 side as shown in FIG. 5, the drive force on the drive pinion 36 side is transmitted to the differential case 98 by way of the pinion gear 92b, the ring gear 93, and the cap 95. In this case, since the differential lock mechanism is in differential free state, the rotational force of the differential case 98 is transmitted to the left and right side gears 101, 102 solely via the differential pinion gears 105, 106, and output to the rear drive shafts 38. At this time, a differential gear for the rear wheels operates, and a difference in rotation between the left and right drive wheels is absorbed. In contrast, in cases such as when one of the wheels rotates idle, differential lock activates, and the rear drive shaft 38 and the differential case 98 are coupled to each other via the sleeve 107. Since the rotational force of the differential case 98 is transmitted to the rear drive shaft 38 via the sleeve 107, the final reduction gear 37 for the rear wheels 17, 18 does not operate, and the left and right drive wheels rotate equally.

FIGS. 7 to 10 show the structure of an operating portion 120 for performing the 2WD/4WD switching and the switching of the differential lock mechanism mentioned above. As shown in FIG. 1, the operating portion 120 is provided in the instrument panel 130 in the driver's seat. The operating portion 120 and the respective final reduction gears 21, 37 of the front and rear wheels mentioned above are coupled to each other through a plurality of cables that will be described later.

Figure 7:
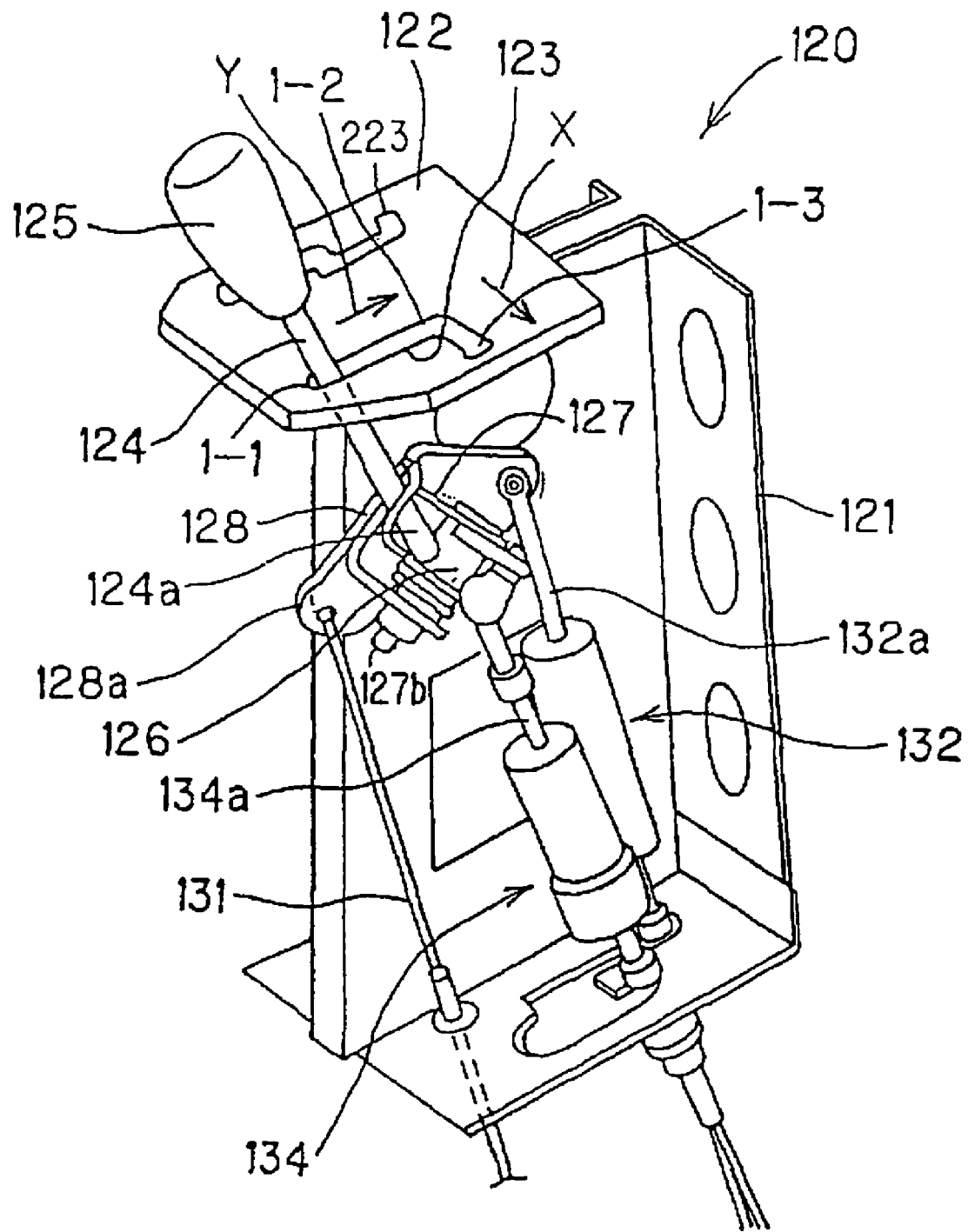
FIG. 7 is a perspective view of an operating portion.

As shown in FIG. 7, the operating portion 120 includes a frame portion 121 and a plate portion 122 fixed to the upper end of the frame portion 121. The frame portion 121 is fixed onto the vehicle frame on the inner side of the instrument panel 130. As shown in FIG. 8, a guide groove 123 of a substantially L-shaped configuration is formed in the plate portion 122. One operating lever 124 fits in the guide groove 123, and a handle 125 is provided integrally at the upper end of the operating lever 124. An operating lever (not shown) for drive, neutral, reverse (D, N, R) is provided in a guide groove 223.

Figure 9:
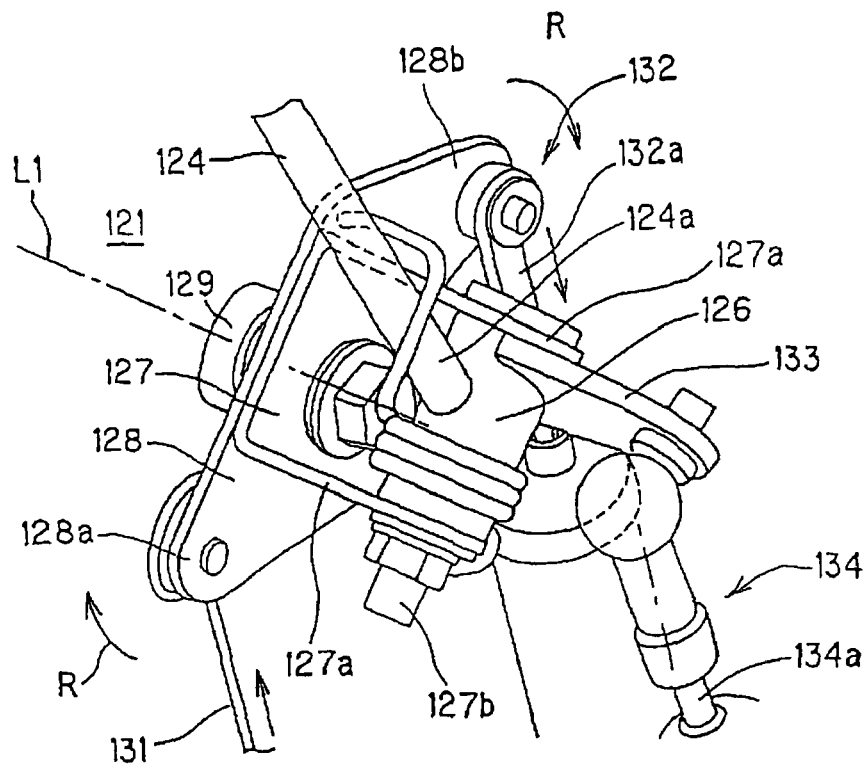
FIG. 9 is a perspective view showing the actuation state of the operating portion.

A lower end 124a of the operating lever 124 extends downwardly through the guide groove 123, and is integrally coupled to a substantially cylindrical boss portion 126 below the plate portion 122 as shown in FIG. 9. The boss portion 126 is supported in place via a pin 127b between a pair of support members 127a of a support bracket 127 formed in a substantially U-shaped configuration, in such a manner that the boss portion 126 can freely rotate in the lateral direction (the other direction) as seen from the driver's seat. Further, the support bracket 127 is fixed to the flange surface of a substantially parallelogram-shaped flange 128. The flange 128 is supported via a pin 129 onto the frame portion 121 so as to be capable of pivotal movement within a plane parallel to the flange surface in the longitudinal direction (one direction) as seen from the driver's seat.

A final clutch pull cable 131 is coupled to one end 128a of the flange 128, and a push rod 132a of a rear differential lock push cable 132 is coupled to the other end 128b thereof. Further, a coupling member 133 is integrally formed in the boss portion 126. A push rod 134a of a front differential lock push cable 134 is coupled to the coupling member 133.

As shown in FIG. 1, the cables 131, 132, 134 each extend downwardly inside the instrument panel 130. The final clutch pull cable 131 is coupled to the distal end of the lever 58 (see FIG. 4A) of the front final assembly 21, and the front differential lock push cable 134 is coupled to a push rod (not shown) coupled to a distal-end pin 90a of the lever 90 (see FIG. 4B) of the front final assembly 21. Further, the rear differential lock push cable 132 extends in a lower portion of the vehicle body further toward the rear of the vehicle to be coupled to a push rod (not shown) coupled to a distal-end pin 110a of the lever 110 (see FIG. 6B) of the rear final assembly 37. When the push cables are used, the push rods are respectively coupled to the operating lever side and the driven side, and these push rods are connected to each other through the push cables.

In this embodiment, the 2WD/4WD switching and the switching of the respective differential lock mechanisms of the front and rear wheels can be effected through switching operation of the single operating lever 124.

Figures 8A, 8B:
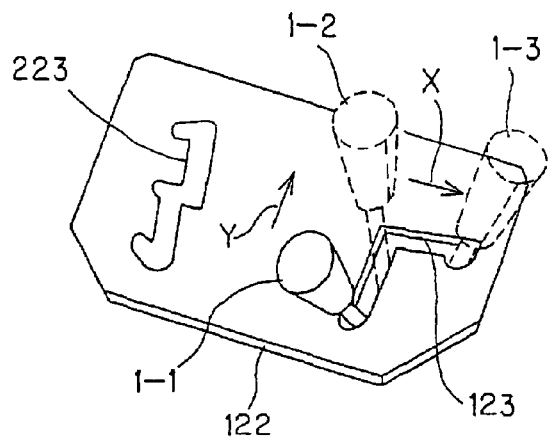
FIG. 8(a) is a top view of the operating portion.
FIG. 8(b) is a diagram showing switching patterns.

In the position 1-1 of the operating lever 124 shown in FIG. 7, the wheels are in 2WD mode, and both the final reduction gears 21, 37 are in differential free position (see FIGS. 8A, 8B).

Upon operating the operating lever 124 shown in FIG. 7 in the longitudinal direction (one direction) indicated by the arrow Y from the position 1-1 to the position 1-2, in the state with the wheels in 4WD mode, the rear wheels 17, 18 are in the differential lock position, and the front wheels 13, 14 are in differential free position. That is, when the operating lever 124 is operated in the longitudinal direction (one direction) indicated by the arrow Y, as indicated by the arrow R in FIG. 9, the flange 128 pivots about the axis L1 of the pin 129, and the final clutch pull cable 131 is pulled and the rear differential lock push cable 132 is pushed. As the final clutch pull cable 131 is pulled, as shown in FIG. 3, the sleeve 55 moves to the right end due to the action of the fork 56, and the front propeller shaft 31 and the drive pinion 54 are coupled to each other via the sleeve 55, thereby switching the wheels from 2WD to 4WD mode. Further, as the rear differential lock push cable 132 is pushed, as shown in FIG. 5, the sleeve 107 moves to the upper side in FIG. 5 due to the action of the fork 108, and the rear drive shaft 38 and the differential case 98 are coupled to each other via the sleeve 107, thereby brining the rear wheels 17, 18 into differential lock position.

Upon operating the operating lever 124 shown in FIG. 7 in the lateral direction (the other direction) indicated by the arrow X from the position 1-2 to the position 1-3, in the state with the wheels in 4WD mode, the rear wheels 17, 18 and the front wheels 13, 14 are both in differential lock position (see FIGS. 8A, 8B).

Figure 10:
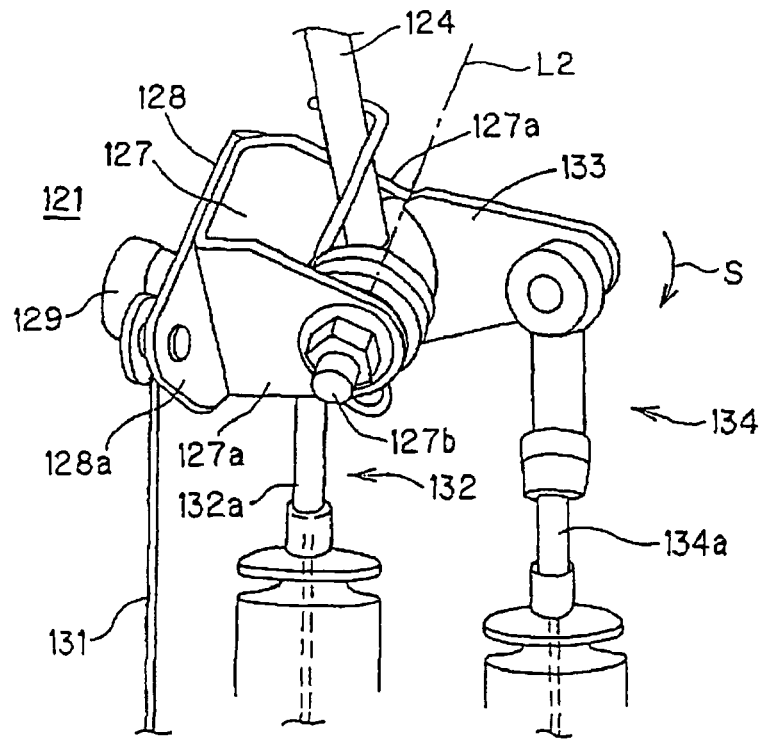
FIG. 10 is a perspective view showing the actuation state of the operating portion.

That is, when the operating lever 124 is operated in the lateral direction (the other direction) indicated by the arrow X, as indicated by the arrow S in FIG. 10, the coupling member 133 fixed to the boss portion 126 pivots about the axis L2 of the pin 127b, and the front differential lock push cable 134 is pushed. As the front differential lock push cable 134 is pushed, as shown in FIG. 3, the sleeve 87 moves to the upper side in FIG. 3 due to the action of the fork 88, and the front drive shaft 33 and the differential case 71 are coupled to each other via the sleeve 87, thereby brining the front wheels 13, 14 into differential lock position.

In this embodiment, the operating portion 120 is constructed as follows. That is, as shown in FIG. 7, the lower end 124a of the operating lever 124 extends downwardly through the guide groove 123 to be coupled integrally to the boss portion 126 below the plate portion 122, the boss portion 126 is supported on the support bracket 127 in such a way that the boss portion 126 can freely rotate in the lateral direction (the other direction) as seen from the driver's seat, the support bracket 127 is fixed onto the flange 128, and the flange 128 is supported on the frame portion 121 (vehicle body side) so as to be capable of pivotal movement in the longitudinal direction (one direction) as seen from the driver's seat. Accordingly, as compared with a construction in which the 2WD/4WD switching operation mechanism and the differential lock switching operation mechanism are separately provided as in the related art, it is possible to achieve a simplified structure and a reduced number of parts. Further, in the related art, since the operating lever is operated in a single direction, the 2WD/4WD switching positions and the differential lock switching positions are present within that single direction, and it is necessary to set the operating lever to the positions corresponding to the respective switching positions. In this embodiment, however, the operating lever is operated in two directions, that is, in one direction and in the other direction substantially perpendicular to the one direction, so the operability of the operating lever is enhanced, and since the terminal end of the guide groove 123 corresponds to the switching position in both the one and the other directions, a positioning member or the like required in the related art becomes unnecessary, thereby achieving a reduction in the number of parts.

The switching from 2WD to 4WD mode and the switching of the rear wheels 17, 18 from the differential free to the differential lock position can be simultaneously effected by a single switching operation of the single operating lever 124 in the longitudinal direction (one direction), and further, the switching of the front wheels 13, 14 from the differential free to the differential lock position can be effected by a single switching operation of the operating lever 124 in the lateral direction (the other direction). The ease of switching operation of the operating lever is thus enhanced. Since the 2WD/4WD switching and the switching of the front differential lock are performed in two different directions, that is, in the one and the other directions, it is possible to ensure reliable operation.

Since a construction is adopted in which the push cable is used for both the front differential lock and the rear differential lock, the push rods are respectively coupled to the operating lever 124 side and the driven side, and these push rods are connected to each other through the push cable, the switching operation can be effected smoothly irrespective of whether the operating direction of the operating lever 124 is the same or different, and a degree of freedom can be provided in terms of the operating direction of the mechanism on the driven side. Although there is particularly a large distance between the operating lever side and the driven side in the case of the rear differential lock, since the rods are respectively connected to the operating lever side and the driven side, and these rods are coupled to each other by the rear differential lock push cable 132, the switching on the driven side can be smoothly effected.

Figure 11:
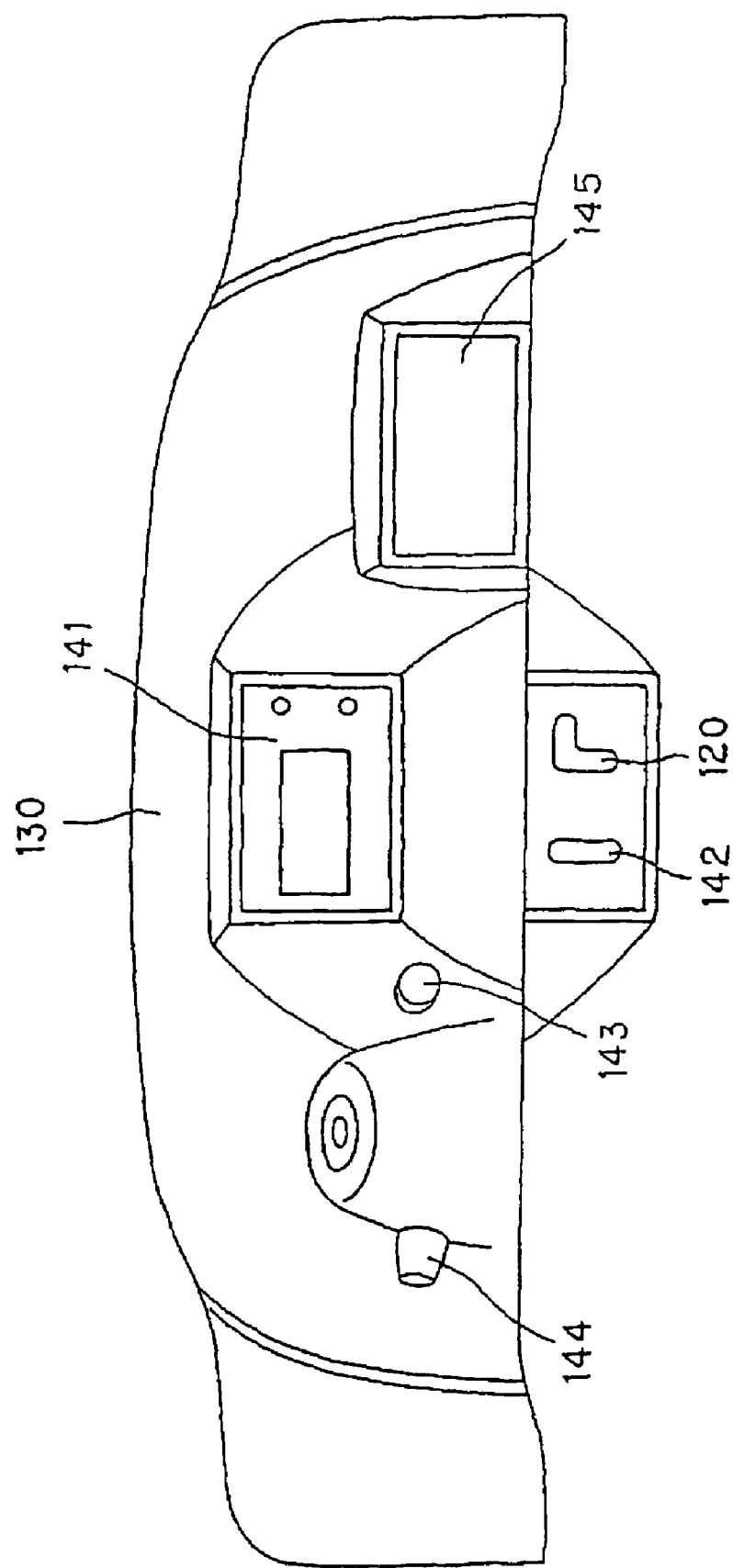
FIG. 11 is a view of an instrument panel as seen from the driver.

FIG. 11 is a view of the instrument panel 130 mentioned above as seen from the driver's seat. The driver's seat is on the left side and the passenger seat is on the right side in FIG. 11.

The instrument panel 130 on the driver's seat side mainly includes a meter display portion 20 located in front of the driver, a shift lever portion 142 arranged on the right side of the meter display portion 141, the above-mentioned operating portion 120 for drive mode switching arranged on the right side of the shift lever portion 142, an ignition switch 143 for starting the engine, and a headlight control switch 144. On the other hand, a console box 145 is provided on the passenger seat side of the instrument panel 130.

The meter display portion 141 is for informing the driver of the driving conditions, and displays to the driver a vehicle speed meter, a tachometer, a fuel remaining indicator, cooling water temperature, battery voltage, indication of abnormal conditions, and the like, for example.

Letters, figures, and the like on these display portions are adapted to transmit light when irradiated with light shone from behind the instrument panel 130, thereby facilitating the visual recognition of these letters, figures, and the like by the driver when driving at night or through a tunnel.

The shift lever portion 142 allows switching of the drive mode to be effected by moving a shift lever (not shown) in the longitudinal direction. The vehicle advances upon moving this shift lever to the lower side, and the vehicle retracts upon moving the shift lever to the upper side. Moving the shift lever to the vertically intermediate position results in the neutral mode. In the operating portion 120, as described above, by operating the operating lever 124 in the longitudinal and lateral directions, it is possible to switch between 4WD and 2WD modes, and to lock the differential gear for the rear wheels while driving or lock the differential gear for the front wheels while driving. The console box 145, which is used for storing small items, has an opening in the surface of the instrument panel 130 and is recessed toward the front side. A cover may be provided to the opening.

Figure 12:
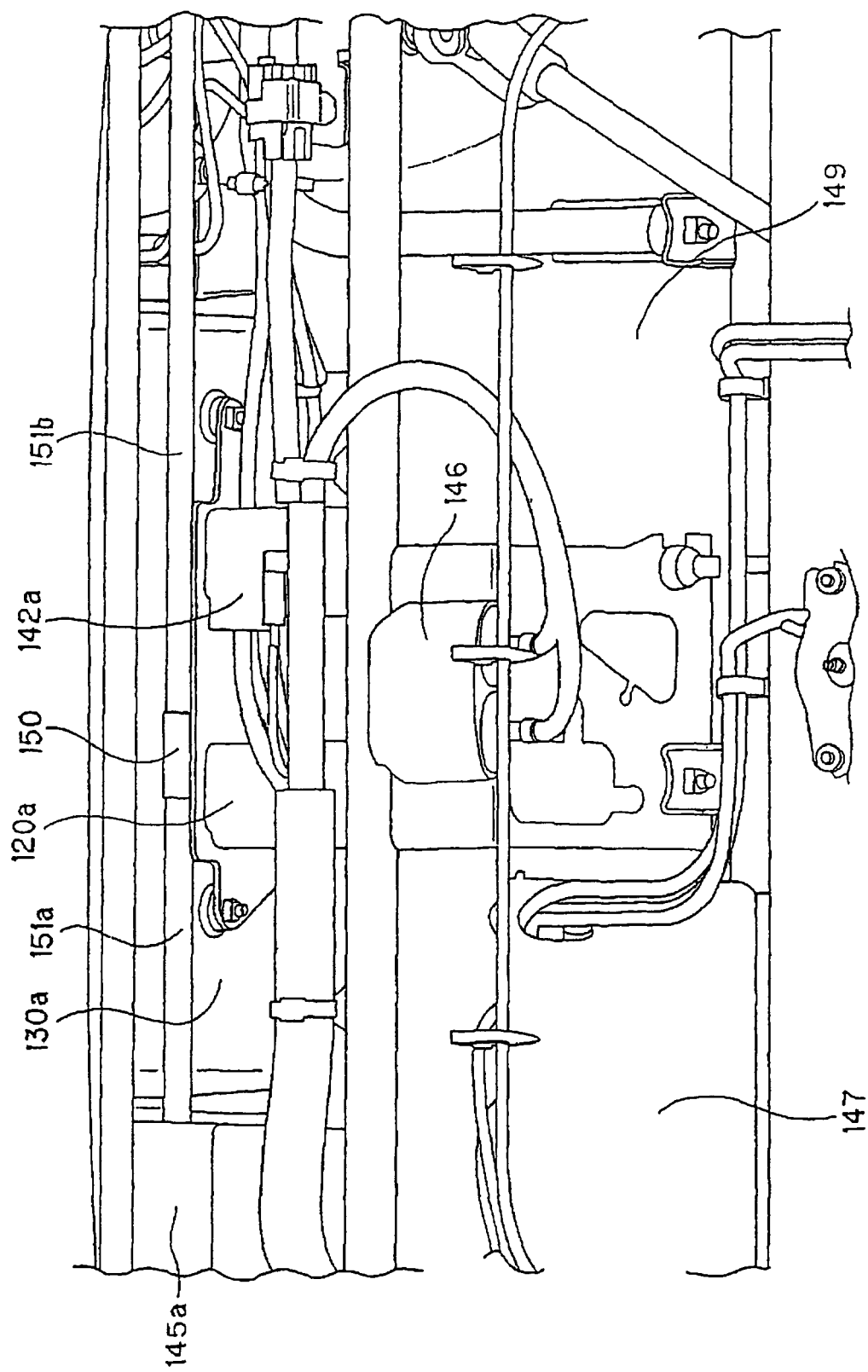
FIG. 12 is a view of the back side portion of the instrument panel as seen from the engine room side.

FIG. 12 is a view of an engine room 149 with the bonnet open, illustrating a back side portion 130a of the instrument panel 130 as seen from the front side of the vehicle. Mounted around the back side portion 130a of the instrument panel 130 are a main body portion 142a of the shift lever portion 142 and a main body portion 120a of the operating portion 120, a regulator 146 for regulating the voltage value, a battery 147, and the like, which are arranged so as to project toward the back side of the instrument panel 130 (the front side of the vehicle). Further, a back surface portion 145a of the console box 145 projects on the back surface of the instrument panel 130.

On the other hand, in the back surface portion 130a of the instrument panel, there are provided one light source (light emitting means) 150 arranged near the main body portion 120a of the operating portion 120, and two acrylic bars (light guide means) 151a, 151b disposed so as to extend to the left and right from the light source 150 along the back surface of the instrument panel 130. As for the number of acrylic bars 151 used, it is also possible to attach the light source 150 near the side portion of the vehicle and provide one acrylic bar 151 so as to extend along the back surface of the instrument panel 130.

A bulb, a light-emitting diode (LED), or the like is used as the light source 150, for example. The light source 150 is mounted on the vehicle body side so as to be replaceable. The light source 150 may be arbitrarily turned on or off by the driver operating a switch or may be turned on simultaneously with the turning on of the headlight 25. The acrylic bars 151a, 151b are each formed in the shape of an elongated acrylic round bar and detachably mounted on the vehicle body side. The acrylic bars 151a, 151b guide the light of the light source 150 in the extending direction of the acrylic bars 151a, 151b, while allowing the leakage of this light through the outer peripheral surface of the round bar. Further, a lens cut may be applied to the outer peripheral surfaces of the acrylic bars 151a, 151b so as to diverge emitted light in the direction of radiation from the axes of the acrylic bars or to converge the emitted light. It should be noted that the acrylic bars 151a, 151b may be either solid or hollow shaped along their extending direction.

Figure 13:
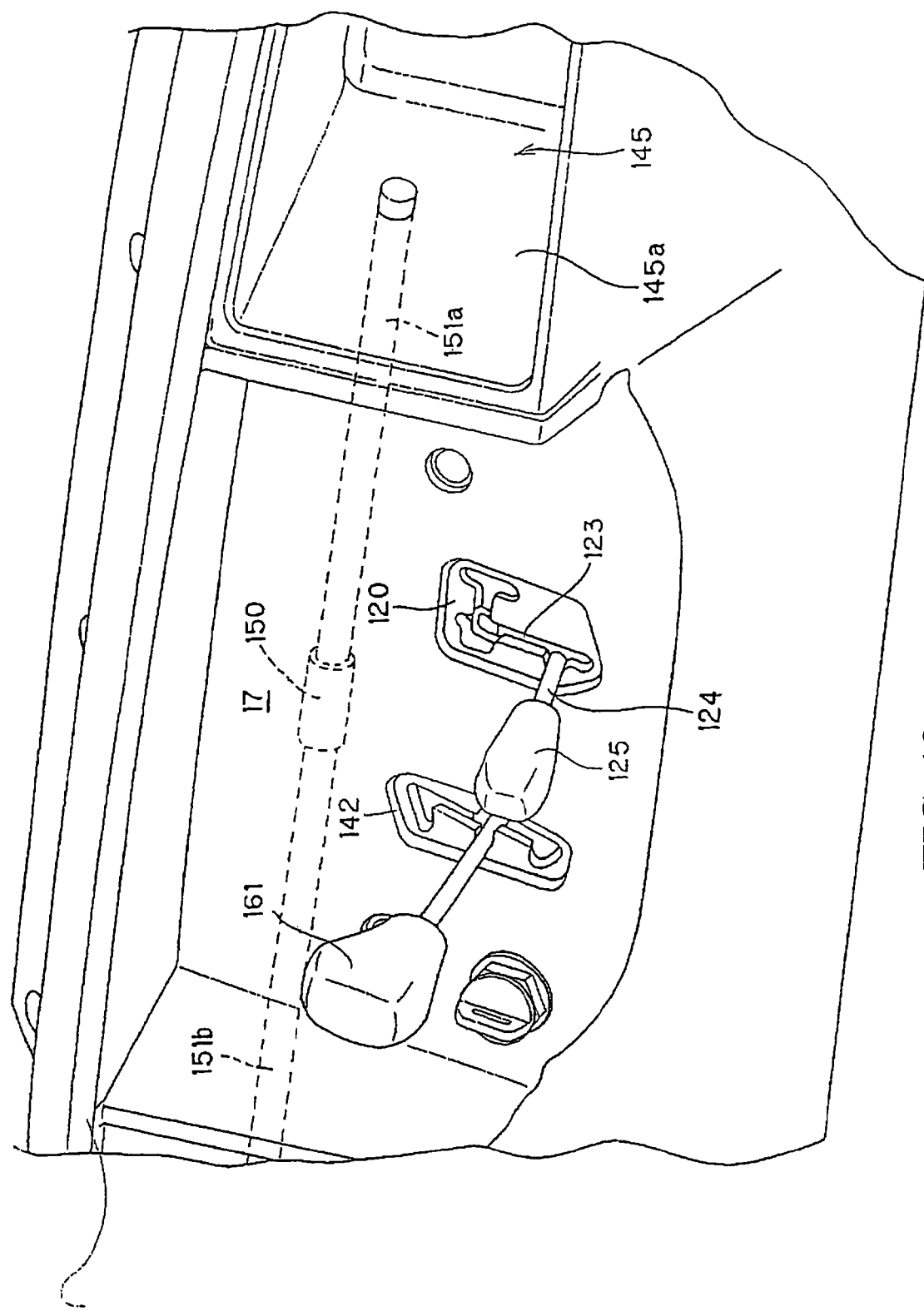
FIG. 13 is a perspective view of the instrument panel of the vehicle.

As shown in FIG. 13, the acrylic bar 151a is mounted such that its one end is arranged near the light source 150 and extends along the back side surface of the instrument panel 130, and its other end extends through a side wall 145b of the console box 145 to reach the interior of the console box 145. One end of the other acrylic bar 151b, is arranged near the light source 150 and extends along the back side surface of the instrument panel 130 in the direction opposite to that of the acrylic bar 151a, and the other end thereof passes through the back side of the meter display portion 141 (see FIG. 11) and extends to behind the meter display portion 141. Accordingly, the acrylic bar 151a illuminates the interior of the engine room 149 from the light source 150 to the console box 145, and the other end of the acrylic bar 151a illuminates the interior of the console box 145, with the other acrylic bar 151b illuminating the meter display portion 141 from the back side.

FIG. 13 is a view of the shift lever portion 142, the operating portion 120, and the console box 145 as seen from the front side of the instrument panel 130. The light of the acrylic bar 151 located on the back side surface of the instrument panel 130 is allowed to leak through the guide groove 123 in which a shift lever 161 and the operating lever 124 moves, or through letters or figures (not shown), thereby facilitating the visual recognition of the positions of the respective levers 124, 161 by the driver when driving at night or through a tunnel. Likewise, the light of the acrylic bar 151 leaks to the front surface side through a portion (not shown) formed so as to allow the transmission of light in conformity with the letters or figures of the meter display portion 141, thereby allowing the visual recognition of the letters or figures even when driving at night or through a tunnel.

In this construction, since the meter display portion 141, the shift lever portion 161, the operating lever 124, and the console box 145 are illuminated from the back surface side of the instrument panel 130 by the light guide means 151 extending from the single light source 150, there is no need to provide a plurality of light sources for illuminating these components individually. It is thus possible to reduce the number of parts of the light source for the vehicle as a whole. Further, since the single light source 150 is used, when the light source 150 has burned out, it only suffices to replace the single light source 150, thus providing ease of maintenance. While the acrylic bar 151 is used as the light guide means, any kind of material capable of guiding light may be used for the light guide means. For example, instead of the acrylic bar 151, it is also possible to form the light guide means by a hollow metal (such as stainless) bar member, and guide the light of the light source inside the hollow bar, with a hole for emission of light being formed in the outer peripheral portion thereof. Further, a reflector that reflects light toward the back surface of the instrument panel 130 may be separately provided outside the outer peripheral surface of the acrylic bar 151 so that light of greater intensity is radiated onto the back surface of the instrument panel 130.

Figure 14:
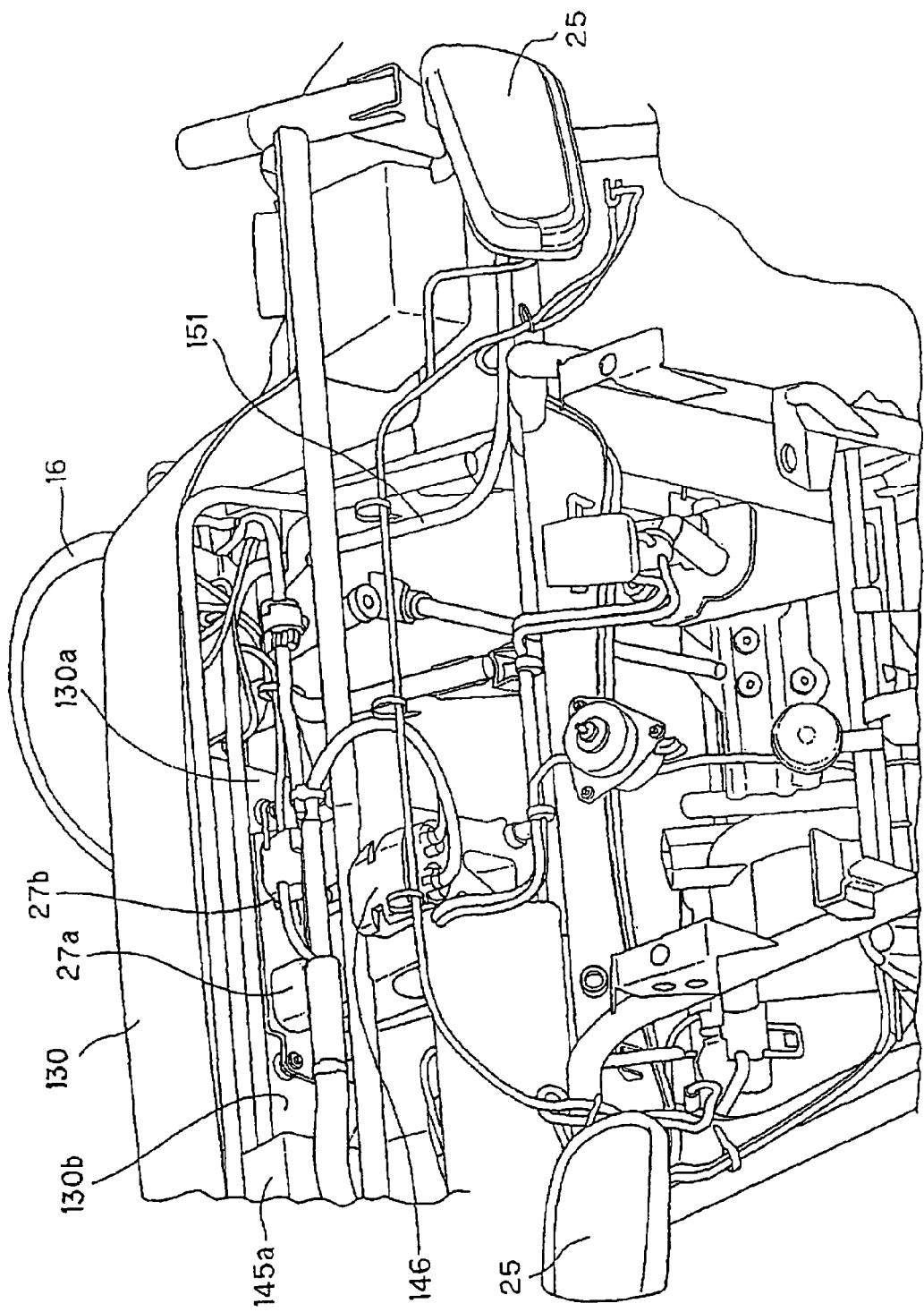
FIG. 14 is a view of the interior of the engine room as seen from the front side of the vehicle.

FIGS. 14 to 16 show another embodiment.

The acrylic bar 151 has its one end arranged near the headlight 25 on the left side of the vehicle. After extending along the left side (the right side surface in FIG. 14) inside the engine room 149 to reach the back side portion 130a of the instrument panel 130, the acrylic bar 151 is bent to the right side (the left side in FIG. 14) and extends in the rightward direction along the back surface of the instrument panel 130, so the other end of the acrylic bar 151 reaches the interior of the console box 145.

As shown in FIGS. 15 and 16, a reflector 153 surrounding the periphery of the light source 150 of the headlight 25 includes a hole 154 formed at a lower right portion as seen from the front as shown in FIG. 16(a). A lens 155 for condensing light is mounted in the hole 154. A light receiving portion 156 for receiving the light from the lens 155 is arranged on the back side of the lens 155. One end of the acrylic bar 151 is connected to the light receiving portion 156. Further, the above-mentioned light receiving portion 156 is mounted on the body side.

Accordingly, upon switching (aiming) the optical axis of the headlight 25 to the upward or downward orientation, even when the reflector 153 pivots vertically about the axis that extends horizontally along the lateral direction, the light receiving portion 156 and the acrylic bar 151 do not pivot together with the reflector 153. This structure prevents bending stress from being exerted on the acrylic bar 151 connected to the light receiving portion 156 due to the pivotal movement of the reflector 153.

According to this construction, since the headlight 25 is used as the light source, there is no need to provide the light source 150 separately, thereby making it possible to achieve a further reduction in the number of parts as compared with a case where such a separate light source 150 is provided. Further, since the meter display portion and the like are illuminated from the back surface side of the instrument panel 130 by the light guide means 151 that extends from the headlight 25, there is no need to provide a plurality of light sources for illuminating these components individually, thereby making it possible to reduce the number of parts of the light source.

On the other hand, even when the reflector 153 pivots vertically, neither the light receiving portion 156 nor the acrylic bar 151 rotates together with the reflector 153. Accordingly, no bending stress due to the pivotal movement of the reflector 153 is exerted on the end of the acrylic bar 151 connected to the light receiving portion 156, so there is no fear of the acrylic bar 151 being broken due to repeated stress. While in the above-mentioned construction the light source 150 is taken from the headlight 25, the light source may be taken from a tail light provided in the outer rear portion of the vehicle. As for the method of taking the light source, as in the case of the headlight 25, a lens may be mounted in a hole provided in the reflector, and light may be received by using a light receiving portion. As in the case of taking the light source 150 from the headlight 25, it is possible to achieve a reduction in the number of parts.

While the acrylic bar 151 is arranged along the left side surface inside the engine room 149, the acrylic bar may be arranged so as to pass through a portion inside the engine room 149 where maintenance or the like is required, such as the engine oil level detecting portion, the vicinity of the battery, and the vicinity of the fan belt. When an abnormality occurs in the engine room 149 at night, the portion of the abnormality can be illuminated brightly by the acrylic bar 151. Further, when the acrylic bar 151 is disposed inside the trunk room of the vehicle, for example, it is possible to illuminate not only the interior of the engine room 149 but also the interior of the trunk room at night.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A drive switching mechanism, comprising:

a boss;

a lever attached to and extending from the boss;

a first flange attached to the boss;

a first cable and a second cable attached to the first flange;

the boss pivotable about a first axis when the lever is moved in a first direction;

the first cable and second cable actuating a rear wheel differential lock when the boss pivots about the first axis;

a second flange connected to the boss;

a third cable attached to the second flange;

the boss pivotable about a second axis when the lever is moved in a second direction;

the third cable actuating a front wheel differential lock when the boss pivots about the second axis.

2. The drive switching mechanism of claim 1, further comprising:
   a U-shaped support bracket connecting the first flange to the boss.

3. The drive switching mechanism of claim 1, wherein the boss is cylindrical.

4. The drive switching mechanism of claim 1, further comprising:
   a plate above the boss, the plate having an L-shaped slot, the lever extending through the slot.

* * * * *